(12) United States Patent
Mabry

(10) Patent No.: US 7,221,837 B2
(45) Date of Patent: May 22, 2007

(54) DEVICE AND METHOD FOR REDUCING GLASS FLOW DURING THE MANUFACTURE OF MICROCHANNEL PLATES

(75) Inventor: Thomas T. Mabry, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 621 days.

(21) Appl. No.: 10/601,161

(22) Filed: Jun. 20, 2003

(65) Prior Publication Data
US 2005/0000249 A1    Jan. 6, 2005

(51) Int. Cl.
*G02B 6/04* (2006.01)

(52) U.S. Cl. .................. 385/120; 65/409; 65/410; 313/103 CM; 250/207

(58) Field of Classification Search ............... 385/126, 385/120; 65/409, 410; 250/207; 313/103 CM
See application file for complete search history.

(56) References Cited

U.S. PATENT DOCUMENTS

| | | | | |
|---|---|---|---|---|
| 3,979,621 A | * | 9/1976 | Yates | 313/105 CM |
| 3,990,874 A | * | 11/1976 | Schulman | 65/393 |
| 4,065,046 A | * | 12/1977 | Roberts et al. | 228/156 |
| 4,126,804 A | * | 11/1978 | Asam et al. | 313/105 CM |
| 4,912,314 A | * | 3/1990 | Sink | 250/207 |
| 4,932,740 A | * | 6/1990 | Berkey et al. | 385/43 |
| 4,983,195 A | * | 1/1991 | Nolan et al. | 65/409 |
| 5,017,206 A | * | 5/1991 | Miller et al. | 65/406 |
| 5,222,180 A | * | 6/1993 | Kuder et al. | 385/115 |
| 5,374,864 A | * | 12/1994 | Roy et al. | 313/103 CM |
| 5,378,955 A | | 1/1995 | Scott, Jr. et al. | |
| 6,165,390 A | * | 12/2000 | Elledge et al. | 264/1.28 |
| 6,183,329 B1 | * | 2/2001 | Cathey et al. | 445/24 |

FOREIGN PATENT DOCUMENTS

| | | |
|---|---|---|
| EP | 0 225 656 A | 6/1987 |
| GB | 1 470 889 A | 4/1977 |

* cited by examiner

*Primary Examiner*—Ellen E. Kim
(74) *Attorney, Agent, or Firm*—RatnerPrestia

(57) ABSTRACT

The present invention provides a glass packing tube for use in fabricating a microchannel plate. The glass tube has a plurality of flat inner surfaces and is used to form a boule including a plurality of optical fibers located in the tube and a plurality of support rods between the first optical fibers and the flat surfaces whereby the tube, fibers and rods are fused together with reduced glass flow.

17 Claims, 3 Drawing Sheets

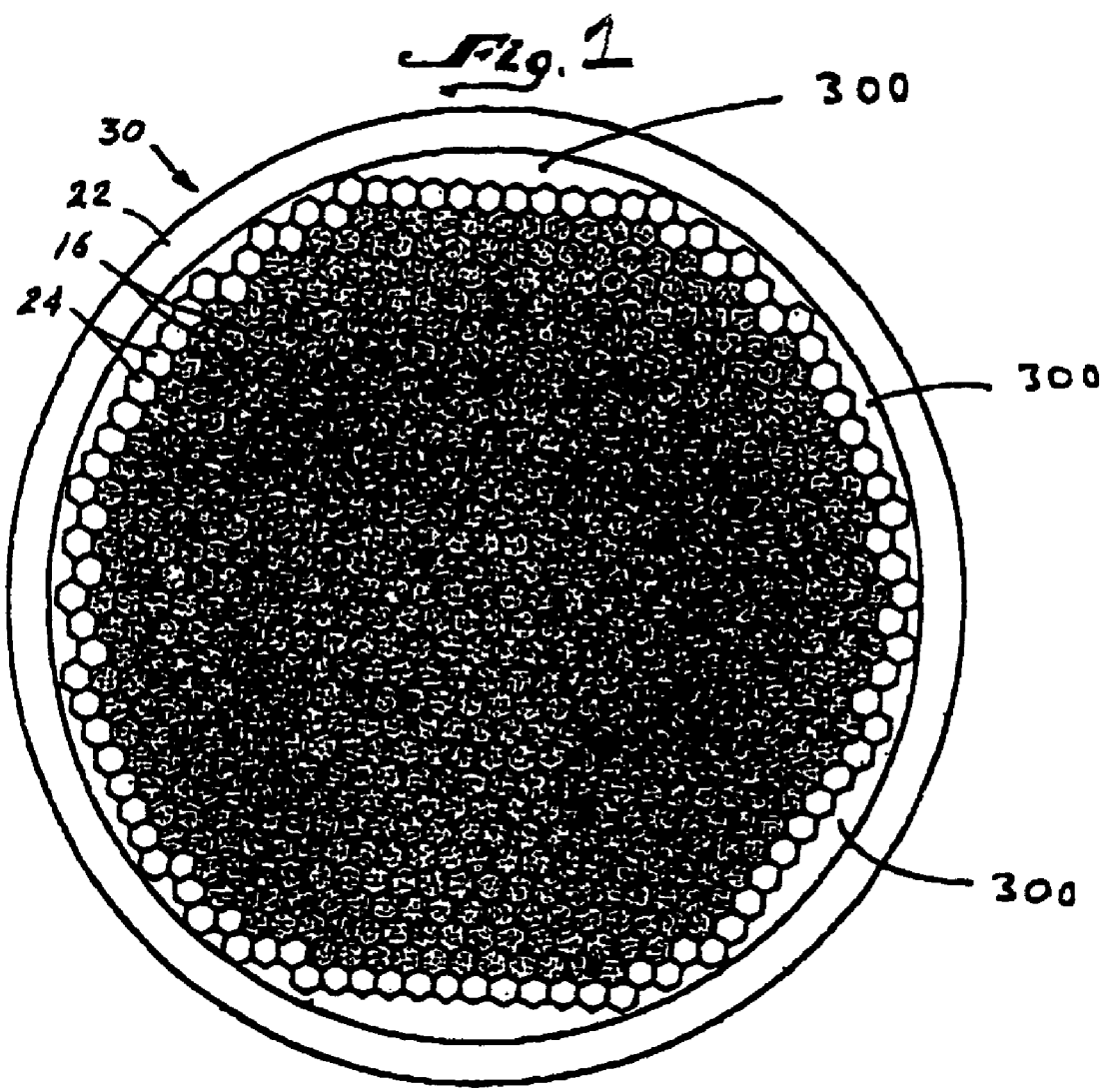

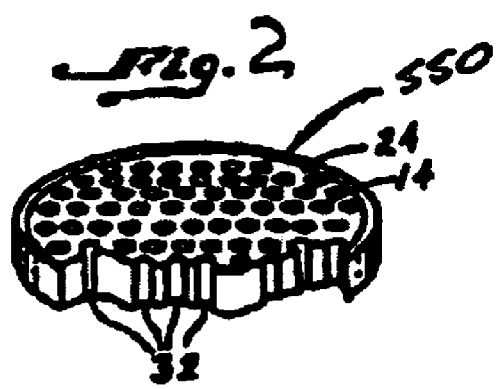
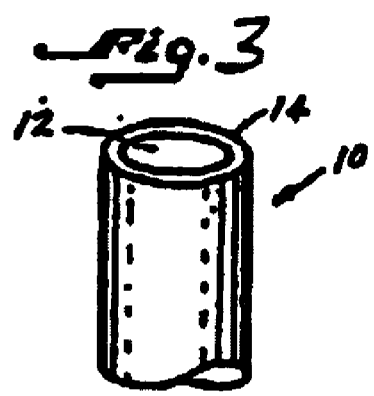
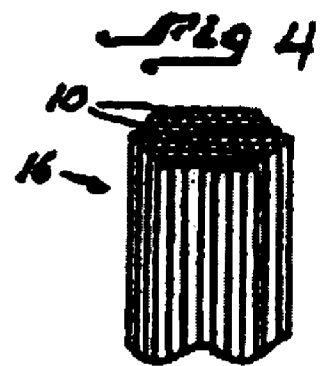

DEVICE AND METHOD FOR REDUCING GLASS FLOW DURING THE MANUFACTURE OF MICROCHANNEL PLATES

FIELD OF THE INVENTION

The present invention relates to microchannel plates for use with image intensifiers, and more specifically, to an arrangement for reducing glass flow during the manufacture of the plates.

BACKGROUND OF THE INVENTION

Microchannel plates are used as electron multipliers in image intensifiers. They are thin glass plates having an array of channels extending therethough and are located between a photocathode and a phosphor screen. An incoming electron from the photocathode enters the input side of the microchannel plate and strikes a channel wall. When voltage is applied across the microchannel plate these incoming or primary electrons are amplified, generating secondary electrons. The secondary electrons then exit the channel at the back end of the microchannel plate and are used to generate an image on the phosphor screen.

In general, fabrication of a microchannel plate starts with a fiber draw processes. An etchable core rod is drawn within a non-etchable silicate tube to form a round fiber comprised of a core rod and cladding layer. These fibers are then bundled and drawn into an equilateral hexagonal shaped pre-form known as a multi-fiber bundle. Each multi-fiber bundle can contain over 10,000 core rod sites. These hex-shaped multi-fiber bundles are packed into a glass packing tube and non-etchable hexagonally shaped support rods are packed between the bundles and the cylindrical wall to form a boule that is fused together in a heating process to produce a solid boule of rim glass and fiber optics. Subsequent process steps entail slicing, beveling, and polishing the glass boule into plates. Afterwards, the plates are etched to remove the core rods within the plates to thus form the channels, each of which is defined by the cladding layer. The channels are then activated and metallized.

Because of the geometries involved in the process described above, when the fibers are fused together the distance between the cylindrical inner wall of the glass packing tube 22 and the support rods 24 will vary. See FIG. 1 of the drawing. In other words, the interstitial space (or open space) between the outer most fibers and the inner surface of the glass packing tube is not constant. This variation means that the inner wall of the glass tube 22 will touch some rods 24 sooner than others during the fusion operation. This time-dependent touching of the fibers will cause the fiber bundles 16 and their individual fibers within the packing scheme to shift during the time period which occurs during the fusion operation. This shifting of the fibers causes the core rods within the bundles to move from the location established by each prior to the beginning of the fusion operation. Movement of the fibers closer together can lead to missing channel walls after the etch process because there will not be enough cladding glass to form a wall between the channels. These missing channel walls can lead to any number of defects such as ion barrier or film emission points, reduced structural integrity and ruptures.

SUMMARY OF THE INVENTION

The present invention includes a hollow packing tube formed of generally non-etchable glass for use in fabricating a microchannel plate. The packing tube has a plurality of flat inner surfaces. Each surface is generally planar and extends generally parallel to the longitudinal axis of the tube.

In another aspect, the invention includes a boule having a plurality of optical fibers, each of which has a core formed of etchable material and a cladding layer formed of a non-etchable material and a plurality of support rods formed of a non-etchable material. The fibers and rods are disposed in the glass packing tube with the rods located between the fibers and the flat inner surfaces of the packing tube.

In still another aspect, the invention includes a method of forming a microchannel plate. The method includes the steps of providing a bundle of fibers having an etchable core surrounded by a non-etchable cladding, packing the fibers into a glass packing tube having a plurality of flat inner surfaces, positioning a plurality of support rods between the fibers and the flat inner surfaces of the packing tube to form a packed boule and fusing the packed boule into a solid boule.

BRIEF DESCRIPTION OF THE DRAWINGS

The invention is better understood by reference to the detailed description that follows taken in conjunction with the accompanying drawings in which:

FIG. 1 is a cross-sectional view of a packed boule in accordance with the prior art;

FIG. 2 is a partial cut-away view of a microchannel plate;

FIG. 3 is a partial view of a fiber used in fabricating microchannel plates;

FIG. 4 is a partial view of a bundle of fibers shown in FIG. 1 for use in fabricating microchannel plates.

DETAILED DESCRIPTION OF THE INVENTION

Figure 5:
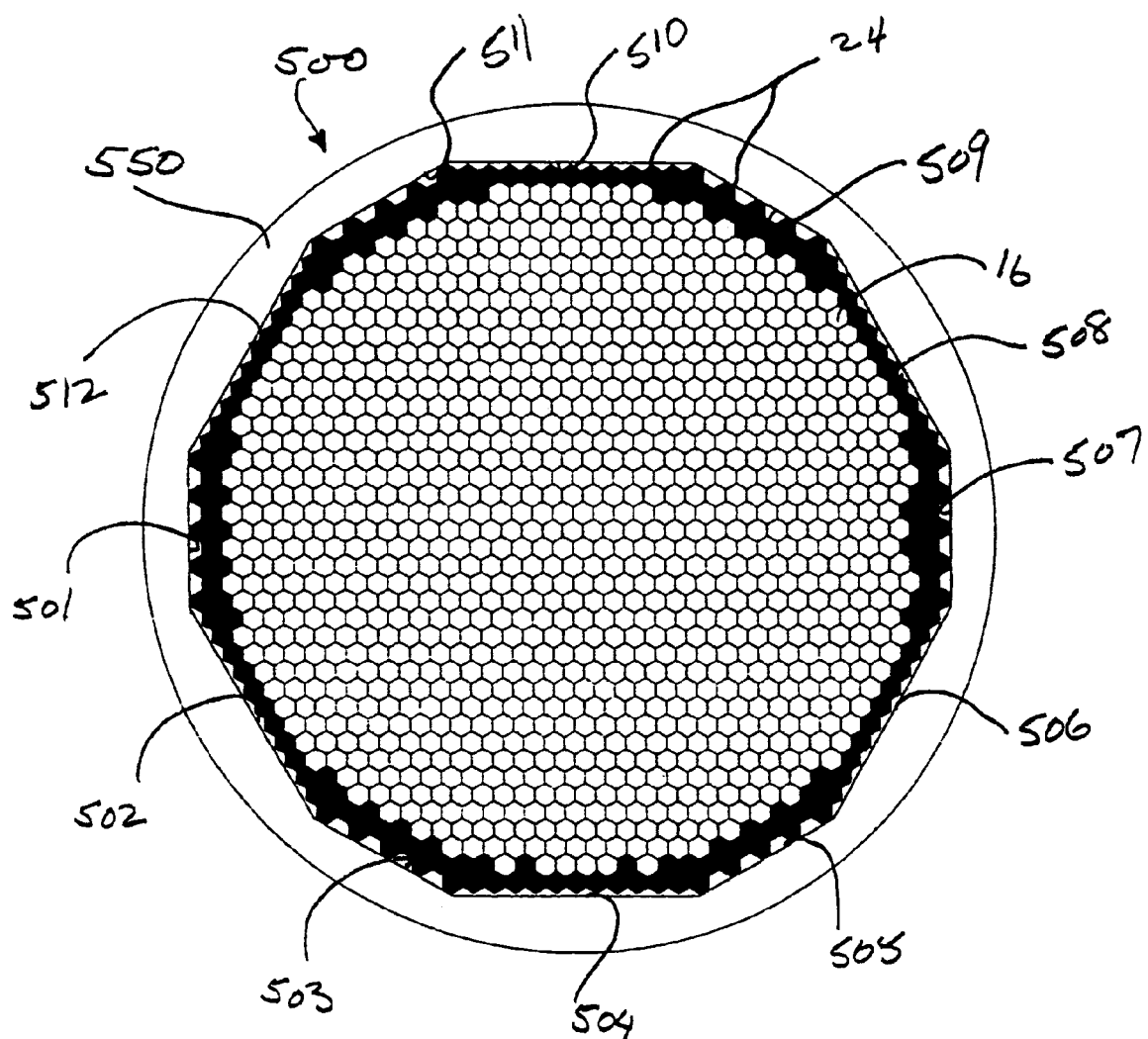
FIG. 5 is a cross-sectional view of a packed boule in accordance with the present invention.

The present invention relates to a glass packing tube 550 used to form boules and which tube is configured to reduce the amount of glass flow when fusing the boule during manufacture of microchannel plates. More specifically, the packing tube 550 according to the present invention is made of non-etchable glass and has multiple flat interior surfaces 501 through 512. These flat surfaces are planar surfaces and allow the packing of fiber bundles 16 and support rods 24 within the glass packing tube 550 while maintaining minimal open space (as compared to a round internal surface) between the outermost support rods and the interior surface of the packing tube. This minimization of open space is advantageous because it reduces the flow of glass during the fusion process that forms a fused boule.

FIG. 3 shows a starting fiber 10 used to manufacture a microchannel plate for use as an electron multiplier. The fiber 10 includes a glass core 12 and a glass cladding 14 surrounding the core. The core 12 is made of a material that is etchable in an appropriate etching solution such that the core can be subsequently removed. The glass cladding 14 is made from a glass which has softening temperature substantially the same as the glass core 2. The glass material of the cladding 14 is different from that of the core 12 in that it has a higher lead content which renders it non-etchable under the conditions used for etching the core material. See, for example, U.S. Pat. No. 4,912,314 or U.S. Pat. No. 5,378,955. Thus, the cladding 14 remains after the etching of the glass core 12 and becomes a boundary for the channel 32 which is left.

The optical fibers 10 maybe formed in the following manner. An etchable glass rod and a cladding tube coaxially surrounding the rod are suspended vertically in a draw machine which incorporates a zone furnace. The temperature of the furnace is elevated to the softening temperature of the glass. The rod and tube fuse together and are drawn into the single fiber 10. The fiber 10 is fed into a traction mechanism where the speed is adjusted until the desired fiber diameter is achieved. The fiber 10 is then cut into shorter lengths.

Several thousands of the cut lengths of the single fiber 10 are then stacked into a graphite mold and heated in order to form a multi-fiber bundle 16 as shown in FIG. 4 wherein the cut lengths of the fibers 10 have fused into a hexagonal configuration. The hexagonal configuration provides a better stacking arrangement.

The multi-fiber or bundle 16, includes several thousand single fibers 10 each having the core 12 and the cladding 14 discussed above. This bundle 16 is then suspended vertically in a draw machine and drawn to again decrease the fiber diameter while still maintaining the hexagonal configuration of the individual fibers. The bundle 16 may then cut into shorter lengths.

Numerous cut multi-fiber bundles 16 are then packed into a precision inner diameter bore glass packing tube 550 as shown in FIG. 5. The packing tube 550 is made of glass material which is similar to the glass cladding 14 and it too is non-etchable when etching away the glass core 12. The glass packing tube 550 has a coefficient of expansion which is approximately the same as that of the fibers 10. The lead glass packing tube 550 will eventually become the solid rim border of the microchannel plate as shown in FIG. 2.

In order to protect the fibers 10 of each bundle 16 during processing to form the microchannel plate, a plurality of support structures are positioned in the glass packing tube 550 between the bundles 16 and flat interior surfaces 501 through 512 of the tube. The support structures may take the form of hexagonal rods of any material which is not etchable under the etching conditions used later to etch the core 12 and which has the necessary strength and the capability to fuse with the glass fibers. Such support structures are shown as support rods 24. The support rods may be one optical fiber or preferably a bundle of any number of fibers up to several hundred. The final geometric configuration and outside dimensions of one support rod is substantially the same as one bundle 16. The assembly thus formed by the fibers 10, support rods 24 and packing tube 550 is a packed boule 500 as shown in FIG. 5.

The boule 500 is then suspended in a furnace and is connected to a vacuum system. The temperature of the furnace is elevated to the softening point of the material of the bundles 16 and the support rods 24. The bundles 16 fuse together, and the support rods 24 fuse to its adjacent bundles 16 and to the inner surface of the packing tube 550.

During this heating step, the support rods 24 act as a cushion between the interior surface of the glass packing tube 550 and the bundles 16. This cushioning provides structural support so that the individual fibers 10 do not distort during the heat treatment. In addition, the cushioning effect of the support fibers 24 makes it possible to use a higher heat during fusion without causing distortion of the fibers 10.

The fused boule is then sliced into thin cross-sectional plates. The planar end surfaces are ground and polished. In order to form the channels 32, the cores 12 of the fibers 10 are removed by etching with dilute hydrochloric acid. After etching, the high lead content glass claddings 14 will remain and form the channels 32. The support rods 24 will also remain solid and thus provide a good transition from the solid rim of the glass packing tube 550 to the microchannels 32.

After etching, the plates are placed in an atmosphere of hydrogen gas whereby the lead oxide of the non-etched lead glass is reduced to render the cladding electron emissive. In this way, a semiconducting layer is formed in each of the glass claddings 14 and this layer extends inwardly from the surface which bounds each microchannel 32.

Thin metal layers are applied as electrical contacts to each of the planar end surfaces of the microchannel plate which provide entrance and exit paths for electrons when an electric field is established across the microchannel plate by means of the metallized contacts.

FIG. 5 shows a cross-sectional view of the packed boule 500 having a packing tube 550 formed with a plurality of flat or planar, inner surfaces 501–512 (in the case of FIG. 5, the number of flat surfaces is twelve). By planar, it is meant that each surface forms a plane and each plane, i.e., each surface extends longitudinally and parallel to the central axis 600 of the tube 550 and is generally perpendicular to the radius of the outer wall of the tube. These inner surfaces can be provided by either machining or mandrel shrinking (over a shaped mandrel) the inside surface of the glass packing tube. Such techniques for forming such glass tubes are known to those skilled in the art. The number of sides can vary and is dependant on the size and shape of the fused boule. In the embodiment disclosed herein where the boule has a generally circular cross-section, it is preferred that the tube 550 has at least 8 flat surfaces and preferably, 12 such surfaces.

Because of the flat inner surfaces 501 through 512, the support rods 24 can be pushed into the tube 550 in either bearing contact with the inner surfaces or in very close proximity thereto. In the preferred embodiment wherein the rods 24 have a hexagonal cross-section, a flat surface of at least some of the rods bears on some of the flat inner surfaces 501 through 512 of the packing tube 550 and a vertex of some of the other rods bears on the flat surfaces. In this way the open spaces between the rods 24 and tube 550 are primarily in the vicinity of the vertices between the flat inner surfaces 501 through 512. Furthermore, to maximize the reduction of open space, it is sometimes preferable for a particular bundle dimension that the facets or surfaces of the multi-sided glass packing tube have different widths (the dimension transverse to the longitudinal axis of the tube 550). FIG. 5 shows this feature. The variation in the width of the flat surfaces depends on the size and shape of the boule to be formed. In the embodiment disclosed herein, 2 different widths are disclosed. The widths surfaces 501, 503, 505, 507, 509 and 511 are the same dimension and are smaller than the widths of surfaces 502, 504, 506, 508, 510 and 512 and all of this latter group are the same dimension. For other desired boule shapes, different variations could be used.

A comparison between the open spaces 300 of the prior art boule shown in FIG. 1 and open spaces seen in FIG. 5 shows a large reduction of open area. This reduction can easily exceed 50% when compared to the prior art boule. Such reduction of open space is important because it reduces the flow of glass during the fusion process. Any level of glass flow can cause the core rods within each bundle of fibers within the boule to move. This movement of the core rods, as discussed above, has the potential to reduce the cladding dimension between each core site. If the clad glass thickness between two sites is reduced too much then there is a potential during the etching step for the clad glass to disappear completely. The absence of any clad glass between two core sites causes a missing channel wall within the plate which damages the performance of the plate. Thus, the reduction in glass flow which is concomitant with the reduction in open space increases the uniformity of the cores within each hex-shaped fiber bundle within the boule. This increase in uniformity produces a superior plate as compared to prior art packing tubes formed with round interior walls.

Although the invention is illustrated and described herein with reference to specific embodiments, the invention is not intended to be limited to the details shown. Rather, various modifications may be made in the details within the scope and range of equivalents of the claims and without departing from the invention. Furthermore, the use of a faceted inner-surfaced shaped packing tube can be used on any application that calls for the bundling of fibers within an outer tube where movement of the interior fibers is undesirable.

What is claimed:

1. A boule for use in fabricating microchannel plates, the boule including:
    a hollow glass tube formed of non-etchable glass, said tube having a plurality of flat inner surfaces, each surface is generally planar and extends generally parallel to the longitudinal axis of the tube; a plurality of optical fibers, located in said tube, each of said optical fibers having a cladding layer formed of a non-etchable material and a core formed of etchable material, and a plurality of support rods formed of non-etchable material located between the flat inner surfaces and the optical fibers.

2. The boule of claim 1 wherein said tube has at least 8 flat inner surfaces.

3. The boule of claim 1 wherein said tube has 12 flat surfaces.

4. The boule of claim 1 wherein the width of the flat surfaces vary.

5. The boule of claim 1 wherein the width of each of a first plurality of flat surfaces has a first dimension and the width of each of a second plurality of flat surfaces has a second dimension different than the first dimension.

6. A boule in accordance with claim 5 wherein the first dimension is smaller than the second dimension.

7. The boule of claim 1 wherein the fibers, rods and the tube are fused together to form a fused boule.

8. A microchannel plate formed from the boule of claim 7.

9. The boule of claim 1 wherein the support rods have a cross-sectional shape including a flat surface for engaging the flat inner surfaces of the tube.

10. A method of forming a microchannel plate, said method comprising the steps of:
    providing a bundle of fibers wherein, each fiber has an etchable core surrounded by a non-etchable cladding;
    packing a plurality of said bundles into a hollow packing tube formed of non-etchable material and which has a plurality of flat inner surfaces;
    positioning a plurality of support rods between said fibers and said flat inner surfaces to form a packed boule; and
    fusing the fibers, packing tube and support rods to form a fused boule.

11. The method of claim 10 wherein the packing tube has at least 8 flat surfaces.

12. The method of claim 10 wherein the packing tube has 12 flat surfaces.

13. The method of claim 10 wherein the width of the flat surfaces vary.

14. The method of claim 10 wherein the width of each a first plurality of flat surfaces has a first dimension and the width of each of a second plurality of flat surfaces has a second dimension different then the first dimension.

15. The method of claim 14 wherein the first dimension is small than the second dimension.

16. The method of claim 10 wherein the support rods have a cross-sectional shape including a flat surface and wherein at least some of the flat surfaces of the support rods engage the flat inner surfaces of the packing tube.

17. The microchannel plate formed by the method claim 10.

* * * * *